Figure 1:
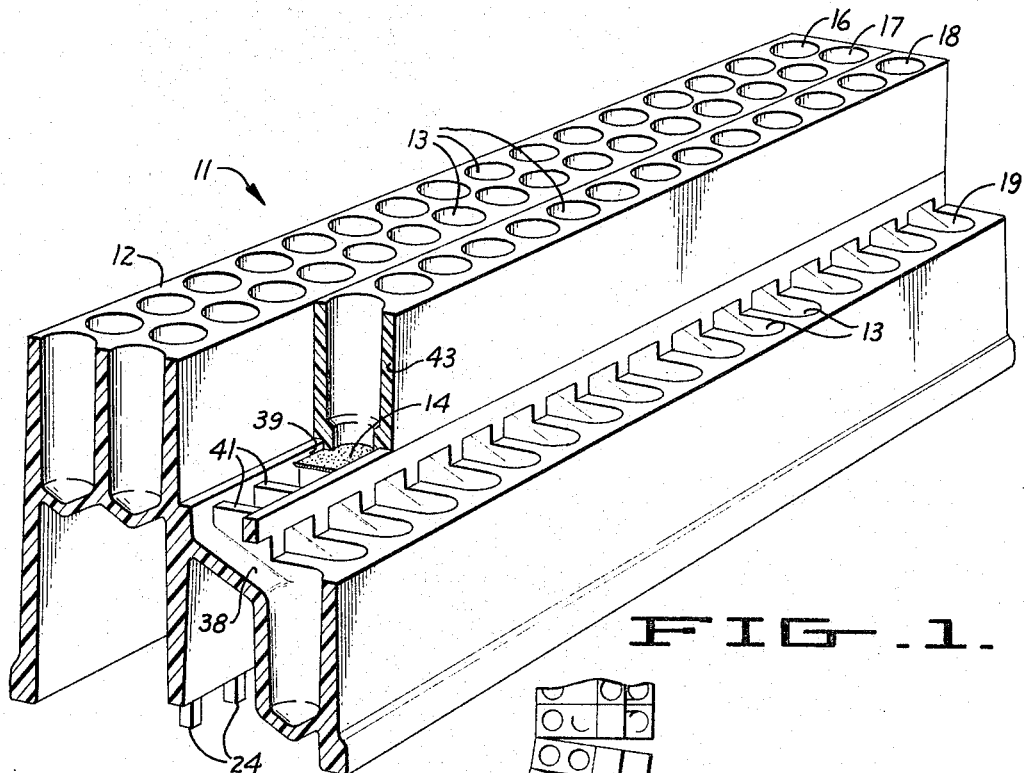

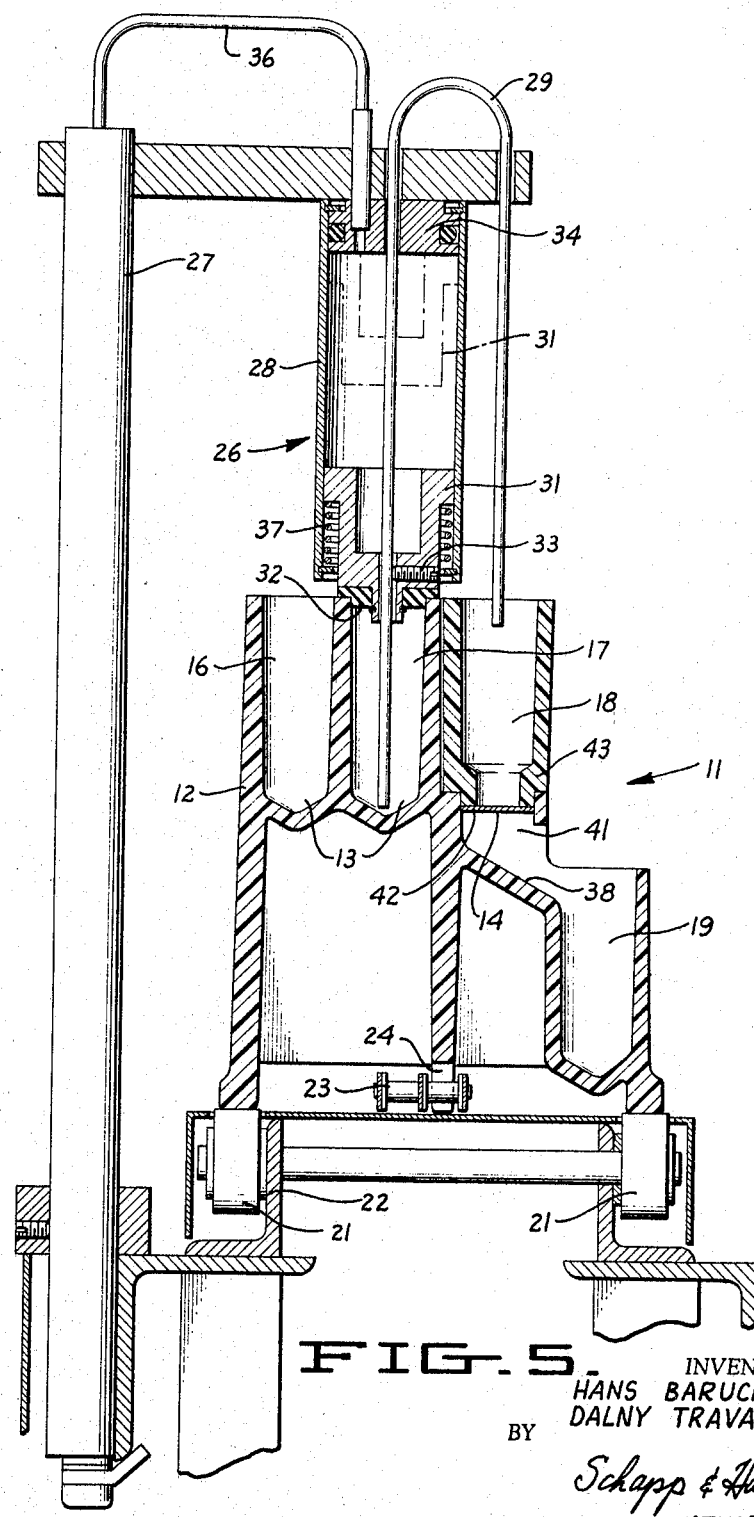

Nov. 1, 1966 H. BARUCH ETAL 3,282,431
SAMPLE CONVEYING AND CONDITIONING UNIT
Filed July 2, 1962 2 Sheets-Sheet 1

INVENTORS
HANS BARUCH
DALNY TRAVAGLIO
BY
Schapp & Hatch
ATTORNEYS

United States Patent Office 3,282,431
Patented Nov. 1, 1966

3,282,431
SAMPLE CONVEYING AND CONDITIONING UNIT
Hans Baruch, Berkeley, and Dalny Travaglio, Kensington, Calif., assignors, by mesne assignments, to Warner-Lambert Pharmaceutical Company, Morris Plains, N.J.
Filed July 2, 1962, Ser. No. 207,122
6 Claims. (Cl. 210—241)

The present invention relates to improvements in a sample conveying and conditioning unit, and more particularly to such a unit adapted to be used in automated analytical equipment.

Many types of chemical analyses require the processing of a great number of samples of similar character. The repetitive performance of similar operations lends itself to automation, and the use of automatic analyzing equipment can result in a material savings in the time of the operator. In addition, the automated equipment provides more uniform procedures with greater accuracy and greater economy through the unattended operation.

However, it is important to use definite fixed analytical procedures for carrying out the analyses, and these procedures are carefully worked out to provide a standard which is of value to the person interpreting the analytical results. Accordingly, it is important to adhere to the standards, and therefore certain steps which have been difficult to automate in simple equipment must be automated in order ot achieve the objectives of the present invention.

One of the steps often used in analytical procedures is the separation of a constituent of a sample, and a typical procedure involves the precipitation and filtration of the constituent. It has been proposed to effect such separations by means of automated centrifuging devices, but such a unit requires a rather complicated mechanism.

In accordance with the present invention, we have provided a unit which is capable of conveying a group of samples through automated analytical equipment, and which is also capable of conditioning the sample within the unit. Specifically, the sample is passed through a conditioning material within the unit. In general, the conditioning material may be a filter, but other materials may be used. For example, an ion exchange resin could be used to effect a desired change on the sample, or the sample could be contacted with activated charcoal or an activated refractory material or ceramic filter to remove certain materials from the sample. The sample may also be treated with filter aids such as diatomaceous earth. In fact, certain material could be separated by electrolytic action or electroplating.

The invention also provides a unit where precipitation or other treatments are effected while the unit is conveyed through an automated system, and this provides a control of the time duration, and allows for other treatments to be provided by the automated equipment. A more complete disclosure of automated equipment which may use the sample conveying and conditioning unit of this invention is given in our copending United States patent application, Serial No. 207,128, filed July 2, 1962, entitled Apparatus for Conducting Analytical Procedural Steps, and assigned to the same assignee as the present application now Patent No. 3,193,359, or the United States patent application, Serial No. 207,124, filed July 2, 1962, by Hans Baruch, an invertor of the present invention, entitled Automated Analytical Apparatus, and assigned to the same assignee as the present application now Patent No. 3,193,358.

It is a primary object of this invention to provide a unit capable of conveying and conditioning samples, and particularly a unit capable of separating constituents from samples as they are carried through analytical procedures in an automated analytical system.

Another object of the invention is the provision of a unit of the character described which is capable of providing filtration or the like in an automated system in a manner similar to the operation conducted by a laboratory technician using manual procdures.

A further object of the invention is the provision of a unit of the character described which is composed of a material that is resistant to chemicals, and which is capable of a long, useful life.

A still further object of the invention is to provide a sample conveying and conditioning unit which is easily cleaned, and which can be fitted with a new conditioning means when necessary between operations.

Further objects and advantages of our invention will appear as the specification continues, and the new and useful features of our automated analytical apparatus will be fully defined in the claims attached hereto.

Figure 2:
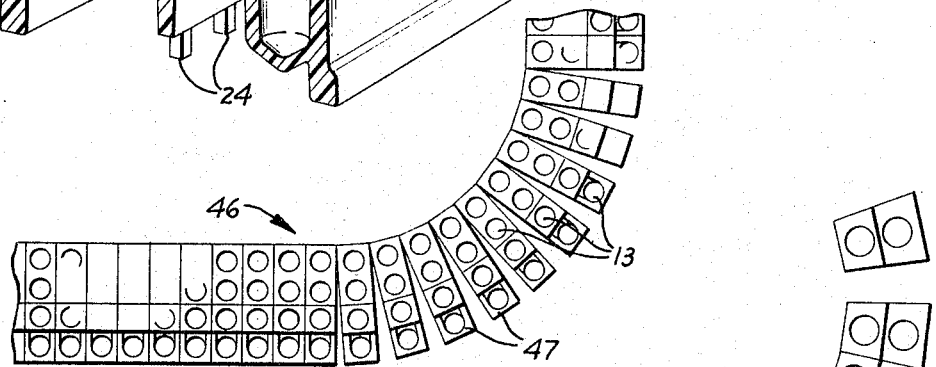
Figure 3:
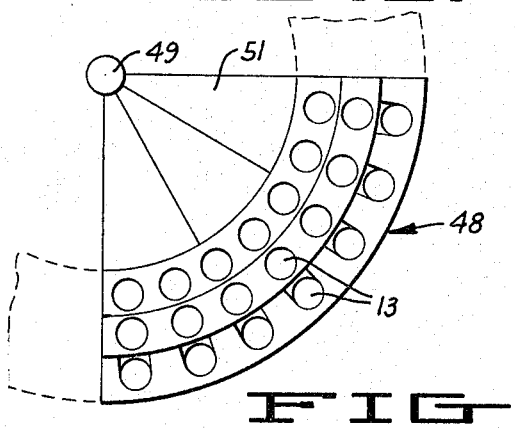
Figure 4:
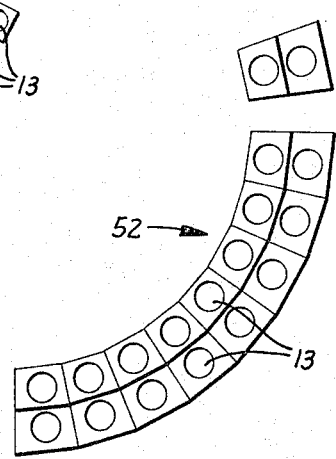

The preferred forms of our invention are illustrated in the accompanying drawings, forming part of this description, in which:

FIGURE 1 is a perspective view of a preferred form of a sample conveying and conditioning unit constructed according to the invention;

FIGURE 2, a plan view illustrating an alternative form of the invention, in which the samples are conveyed in both a straight line and in a circular path;

FIGURE 3, a plan view illustrating still another form of the invention in which the samples are to be conveyed in a circle;

FIGURE 4, a plan view of yet another form of the invention showing still another shape for the unit of the invention; and FIGURE 5, a cross-sectional view of the unit shown in FIGURE 1, illustrating a transfer means which is particularly useful in moving samples into operative position for treatment according to the invention.

While we have shown only the preferred forms of our invention, it should be understood that various changes or modifications may be made within the scope of the claims hereto attached, without departing from the spirit of the invention.

Referring to the drawing in greater detail, there is shown in FIGURE 1 a sample conveying and conditioning unit 11, comprising a housing 12 having a plurality of laterally spaced open top compartments 13 serving as sample containers, and a sample conditioning means such as filter paper 14. The unit may be made of any suitable material, but it is preferably molded from a moldable plastic.

Thus, in the preferred form, the unit is in the form of a block having four parallel rows of containers or compartments adapted to hold sample material. Row 16 is adapted to receive samples, and the samples are moved progressively across the unit through rows 17, 18, and 19. Various treatments may be effected on the samples as it moves laterally across the unit, and a separation is carried out as the sample moves from row 18 to row 19.

In a typical operation, the samples are conveyed linearly through a plurality of sample stations by a suitable conveyeor means, and the treatments necessary to provide the desired analytical procedures are carried out. Preferably, the samples are moved stepwise and the treatments are spaced at selected positions to time the period between operations, as disclosed more completely in the copending United States patent applications cited above.

As best seen in FIGURE 5, the units are carried on rollers 21 which are journaled for rotation in a mounting 22, and movement is imparted to the unit by chain 23 which engages lugs 24 on the bottom of the unit 11. The samples are generally loaded into the compartments of row 16, and a measured quantity of sample transferred to row 17 along with a precipitating reagent in a transfer device (not shown). The slurry is then transferred into filtering position by a transfer device 26.

The transfer device 26 comprises a support 27 which is adjustable to present the device at any desired sample station, and a cylinder 28 carried by the support and adapted to move tube 29 vertically into and out of position for effecting transfer of liquid. Tube 29 is shaped like an inverted U, and has its ends in communication with a compartment of row 17 and a compartment of row 18 respectively.

Cylinder 28 comprises a plunger 31 slidably mounted therein so as to move between the position shown and the position shown in phantom in FIGURE 5. Plunger 31 has a lower surface 32 adapted to fit in sealing engagement with the top of the container 13 of row 17 so that on downward movement of the plunger a positive pressure may be applied in the container. Tube 29 is held in plunger 31 by a screw 33 with the passage through the plunger being larger than the outside of the tube so as to leave a passage through the bottom of the plunger. This passage is small enough that a positive pressure builds up within the cylinder and yet large enough to allow air to communicate therethrough. Tube 29 is carried sealingly by an end section 34 at the upper end of cylinder 28 so that no other loss of air pressure occurs.

In operation, air pressure is provided through line 36, which pressure causes plunger 31 to move downward carrying tube 29 with it and into position. As the plunger 31 moves downward, the surface 32 provides a seal in the container 13, and air pressure then passes from within the cylinder 28 down through the passage around tube 29 and into the container to provide a superatmospheric pressure therein. This pressure then causes a liquid to be forced through tube 29 so that substantially all of the liquid is removed and forced into the container 13 of row 18. In order to transfer all of the material, it is necessary to provide a sloping bottom or some equivalent structure, and have the tube communicate to the point where all of the liquid may be removed. When the air pressure is shut off in line 36, the superatmospheric pressure within the cylinder and within the container is soon reduced by movement of excess gas through tube 29, which serves to clear the last liquid through the tube as well as to reduce this pressure. With the pressure thus reduced, spring 37 forces the plunger 31 back to the position shown in phantom. In this way, the plunger and tube are, withdrawn so that the unit 11 may be advanced to the next station.

As the slurry is delivered into a compartment of row 18, it passes down through the passage 38 into a compartment of row 19. The filter paper 14 is disposed at the upper end of the passage 38, fitting in a slot 39 defined by support ribs 41 and the lower surface 42 of removable section 43. Therefore, separation occurs between the solid precipitate and the liquid filtrate, and the filtrate is carried in the compartments of row 19 for further treatment and/or transfer to other pieces of equipment for completion of the analysis.

Although we have shown a unit using a filter paper, it is apparent that other filters may be used. For example, fiber filters such as asbestos or glass could be used, or ceramic filters, or any other conventional filter can be used. Alternatively, other conditioning means can be used in this system, the only necessary criterion being that the conditioning means contacts the sample material as it passes through the passage 38. Easy replacement of the filter between runs is achieved by making the row of compartments 18 removable, as removable section 43, and this section is held in place by a tight engagement of the section.

While the block unit shown in FIGURES 1 and 5 is preferred, it is possible to use other forms of the unit, and typical examples are shown in FIGURES 2 through 4. As shown in these embodiments, the units may be fitted together to provide rows of samples, the number of rows of sample stations may be any number greater than one, and the path of movement of samples may be varied without departing from the spirit of the invention.

Thus, in FIGURE 2, there is shown an assembly 46 made up of individual units 47, which have four compartments corresponding to the four rows of compartments of FIGURE 1 with only one sample being handled by each unit. With this construction, the samples may move in both a straight path and an arcuate path. Otherwise, the unit is similar to that shown in FIGURE 1.

FIGURE 3 illustrates a unit constructed according to the invention which is adapted to carry the sample in rotary motion. Thus, there is shown a unit 48 adapted to be rotated around a central point 49 to carry the samples in circular fashion. Accordingly, the unit may be used as a turntable with arms 51 connecting the unit to a central hub. Only three rows of sample compartments are shown, because these are sufficient for certain operations.

FIGURE 4 shows a group of filter units 52 in which the shape is in the form of a wedge, and the minimum number of compartments are shown. As here shown, two compartments are illustrated, and this is sufficient to provide a chamber to hold slurry and a chamber to receive filtrate.

From the above description, it is seen that we have provided a filter unit or the like suitable for use in automated analytical systems. It is also apparent that the unit is simple in construction, and is capable of conducting a filtering step in an automated system in a manner analogous to the manner in which a laboratory technician would carry out the same operation manually.

We claim:

1. A sample carrying and conditioning unit for separation of a component of a sample in automated analytical apparatus, comprising a plurality of discrete conditioning sections each containing walls defining an open-top upper compartment and an open-top lower compartment disposed vertically and laterally offset from said upper compartment, with a passage in communication between the bottom of the upper compartment and the lower compartment, pervious sample conditioning means disposed across said passage between the upper compartment and said lower compartment, the walls of one of said upper and lower compartments being constructed as a removeable unit to facilitate replacement of said conditioning means, and means maintaining the compartments in a lateral linear arrangement whereby successive compartments may be conveyed to and through a fixed reference position.

2. The sample carrying and conditioning unit defined in claim 1, in which the unit includes a conveyor, with the plurality of discrete conditioning sections mounted on the conveyor.

3. The sample carrying and conditioning unit defined in claim 1, in which the porous conditioning means is a filter.

4. A sample carrying and conditioning unit for separation of a component of a sample in an automated apparatus, comprising a housing in block form having two rows of vertically and laterally offset open-top compartments, one of said rows being a plurality of upper compartments and the other of said rows being a plurality of lower compartments, with the upper and lower compartments being paired so that each upper compartment has a lower compartment disposed vertically and laterally offset therefrom, with a passage in communication between the bottom of the upper compartment and the top of the paired lower compartment, pervious sample conditioning means disposed across said passage between the upper compartment and said lower compartment, the walls of one of said rows of upper and lower compartments being formed as a removeable unit to facilitate replacement of said conditioning means, and means maintaining the compartments in a lateral linear arrangement whereby successive compartments may be conveyed to and through a fixed reference position.

5. The sample conveying and conditioning unit defined in claim 4, in which the porous conditioning means is a filter.

6. The sample conveying and conditioning unit defined in claim 4, in which the housing includes two rows of auxiliary open-top compartments disposed in parallel relation to the row of upper compartments.

References Cited by the Examiner

UNITED STATES PATENTS

| | | | |
|---|---|---|---|
| 346,964 | 8/1886 | Walsh | 141—233 X |
| 579,098 | 3/1897 | Smale | 210—203 X |
| 807,547 | 12/1905 | Fliegel | 210—445 X |
| 2,310,714 | 2/1943 | Slaughter | 222—400.7 |
| 2,894,542 | 7/1959 | Alm | 141—130 |
| 3,081,158 | 3/1963 | Winter | 73—423 |
| 3,098,719 | 7/1963 | Skeggs | 23—253 |

REUBEN FRIEDMAN, *Primary Examiner.*

HERBERT L. MARTIN, *Examiner.*

F. MEDLEY, R. A. CATALPA, *Assistant Examiners.*